United States Patent [19]

Scop et al.

[11] Patent Number: 5,390,360
[45] Date of Patent: Feb. 14, 1995

[54] R.F. COMMUNICATION SYSTEM INTERROGATION APPARATUS AND METHOD

[75] Inventors: Shlomo Scop, Netanya; Shmuel Katar, Tnuvot, both of Israel

[73] Assignee: Motorola, Inc., Schaumburg, Ill.

[21] Appl. No.: 977,361

[22] Filed: Nov. 17, 1992

[30] Foreign Application Priority Data

Dec. 23, 1991 [GB] United Kingdom ................. 9127291

[51] Int. Cl.⁶ .............................................. H01Q 9/00
[52] U.S. Cl. ................................. 455/34.2; 455/38.1;
455/53.1; 340/825.54
[58] Field of Search ................... 455/34.2, 34.1, 49.1,
455/51.1, 51.2, 53.1, 54.1, 54.2, 56.1, 38.2;
370/85.2, 85.6; 340/825.54

[56] References Cited

U.S. PATENT DOCUMENTS

| | | | |
|---|---|---|---|
| 4,352,183 | 9/1982 | Davis et al. | 455/34.2 X |
| 4,534,061 | 8/1985 | Ulug | 455/38.1 X |
| 4,628,311 | 12/1986 | Milling | 370/85.2 X |

FOREIGN PATENT DOCUMENTS

| | | | |
|---|---|---|---|
| 0064818 | 11/1982 | European Pat. Off. | H04L 11/16 |
| 0076880 | 4/1983 | European Pat. Off. | H04L 11/16 |
| 0094180 | 11/1983 | European Pat. Off. | H04L 11/16 |
| 2050763 | 1/1981 | United Kingdom | H04B 1/02 |
| 2063011 | 5/1981 | United Kingdom | H04Q 7/00 |

*Primary Examiner*—Edward F. Urban
*Assistant Examiner*—Philip J. Sobutka
*Attorney, Agent, or Firm*—Wayne J. Egan

[57] ABSTRACT

In a radio frequency communication system, a primary unit interrogates a plurality of secondary units over a radio communication channel. The primary unit receives a command to initiate an interrogation cycle over the communication channel. The primary unit then selects a time delay from a set of time delays, and transmits an interrogation request to each secondary unit of at least a subset of the plurality of secondary units in series after the selected time delay if the channel is free at the end of the selected time delay. The primary unit then selects the longest time delay for the next interrogation cycle if a channel grant command is received, and selects a shorter time delay for the next interrogation cycle if no channel grant command is received.

6 Claims, 4 Drawing Sheets

R.F. COMMUNICATION SYSTEM INTERROGATION APPARATUS AND METHOD

BACKGROUND OF THE INVENTION

This invention relates to a method of contending for access to a communication channel and communications apparatus for communication on the channel such as supervisory control and data acquisition (SCADA) apparatus.

SUMMARY OF THE PRIOR ART

In recent years, the radio channels have become very crowded for voice communication as well as for data communication.

In a communications system such as SCADA system, there may be a number of master control units located in different places, all trying to interrogate corresponding remote terminal units (RTUs) on the same radio frequency, frequently even using the same radio repeater. A typical application in which this situation is common is a siren control system. Such a system is illustrated in FIG. 1. In this figure, there is one main controller 11 that sends a siren activation control signal to a number of RTUs 16—each having a siren 17 associated with it—in a large area via a common repeater 12, and also to regional centers 13, 14 and 15. The regional centers have responsibility for gathering data from a group of sirens after control. Each regional center has to interrogate its sirens after activation, to find out if there are any problems with the activation, and they all have to do this via the same common repeater 12. Usually this situation has the potential of creating chaos on the radio channel, since all regional centers will start the interrogation at the same time, with the result that none of the regional centers is able to receive answers from its sirens in a reasonable time.

It would be possible to provide a fixed queue such that one of the regional centers is always the first to interrogate its RTUs, another regional center is always the second etc., but this possible solution has the disadvantage that the last regional center's operator always has to wait a long time between the siren activation control signal and the appearance of the results on a monitor screen. This delay is not acceptable. The absence of physical lines between the regional centers means that there is no simple way of synchronizing the centers to allow all operators of the regional centers to be up-dated in equal time.

There is a need for a communication system which allows an orderly contention for access to the channel, without introducing undue delay for response from any particular unit.

SUMMARY OF THE INVENTION

According to the invention, a method of contending for access to a communication channel is provided comprising the steps of receiving a command to initiate contention, selecting a time delay from a set of time delays, transmitting a channel access request after the selected time delay, selecting the longest time delay for the next contention if a channel grant command is received and selecting a shorter time delay for the next contention if no channel grant command is received.

In this way, a revolving time delay is provided, in which a unit that is successful in contention goes to the bottom of the queue by virtue of introducing the longest time delay before it is able to contend again and a unit that is unsuccessful in contention raises its place in the queue by virtue of having a shorter time delay upon the next contention.

The length of delay is related to the position in the queue because other units with shorter delays have the opportunity to request access to the channel during the delay period.

In a further aspect of the invention, a communication unit is provided for communicating with another unit over a channel comprising means for contending for access to the channel, means for receiving a channel grant command and means for transmitting to the other unit on receipt of the command, wherein the means for contending comprise delay means for delaying contention for a period of time selected from a set time delays and wherein, immediately following a successful contention, the time delay selected for the next contention is the longest of the set of time delays and wherein, following an unsuccessful contention, a shorter time delay is selected for the next contention.

Two or more such units (regional centers) may be provided in which the time delays of the set of time delays of one unit are offset from, and interspersed between, the time delays of the set(s) of time delays of the second (and further) unit(s).

The invention also provides a communication system as defined in the claims.

A preferred embodiment of the invention will now be described by way of example only with reference to the drawings.

DETAILED DESCRIPTION OF THE PREFERRED EMBODIMENT

Figure 1:
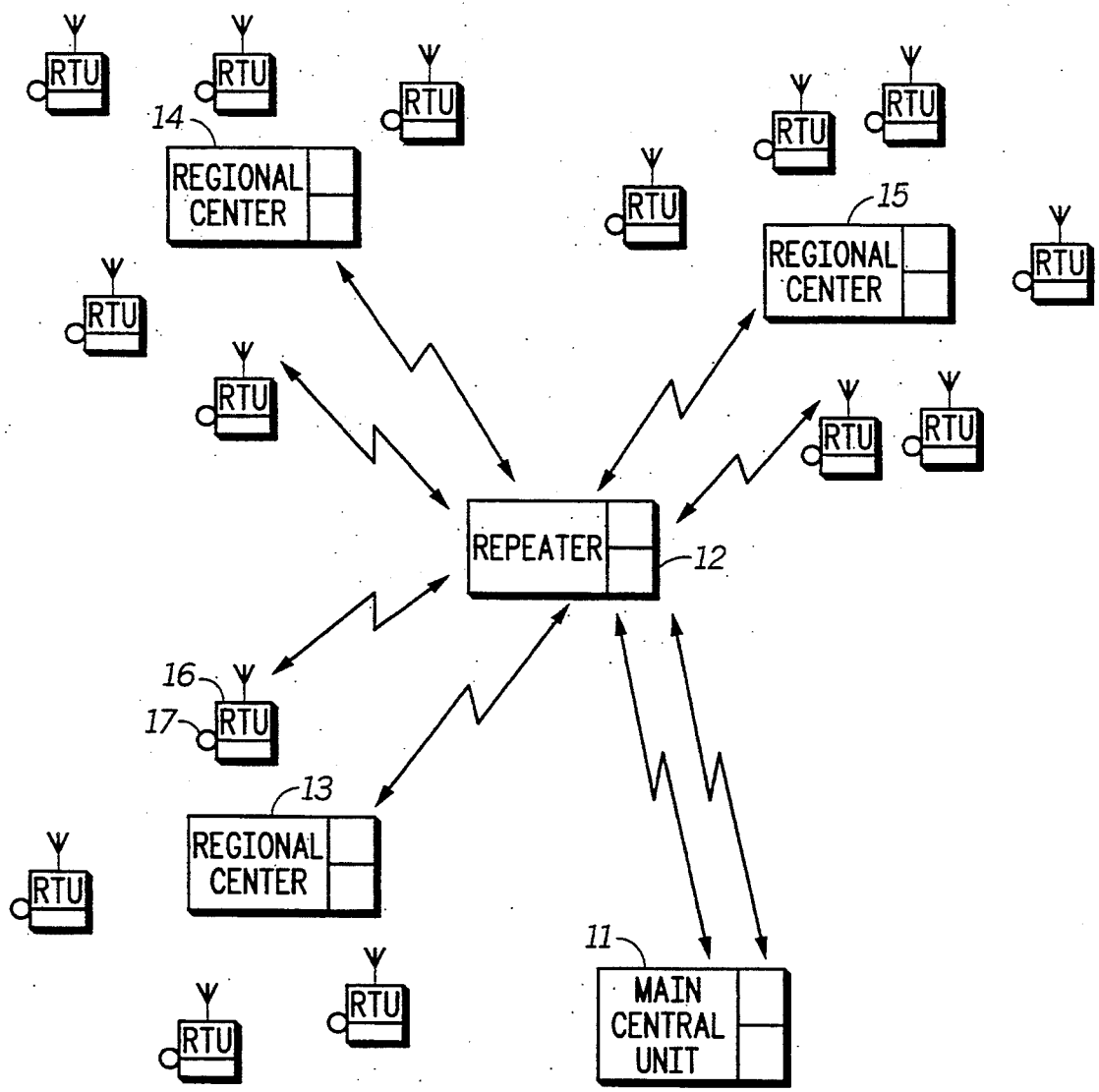
FIG. 1 shows a general SCADA communication system in accordance with the prior art and suitable for modification in accordance with the invention.

The operation of the system of FIG. 1 is as follows. The main central unit 11 issues a command to all the RTUs 16 causing them to activate their sirens. This command is communicated via the repeater 12 and directly from the repeater to all the RTUs 16. On receipt of the command, the sirens 17 start up. At the same time, the regional centers 13, 14 and 15 receive the command via the repeater 12 and an interrogation cycle is initiated, in which the regional centrals 13 interrogate all the RTUs in their respective regions and take appropriate steps if there are sirens that have failed to start up. An appropriate step could, for example, be displaying at a monitor at the regional center 13 the fact that a siren has failed, prompting the operator to dispatch a team to the location of that siren to manually alert people in that region of the warning in question. The regional centers 13 can report back to the main central unit 11 the results of their interrogation routines. The interrogation routine is described in greater detail below with reference to FIG. 3.

Figure 2:
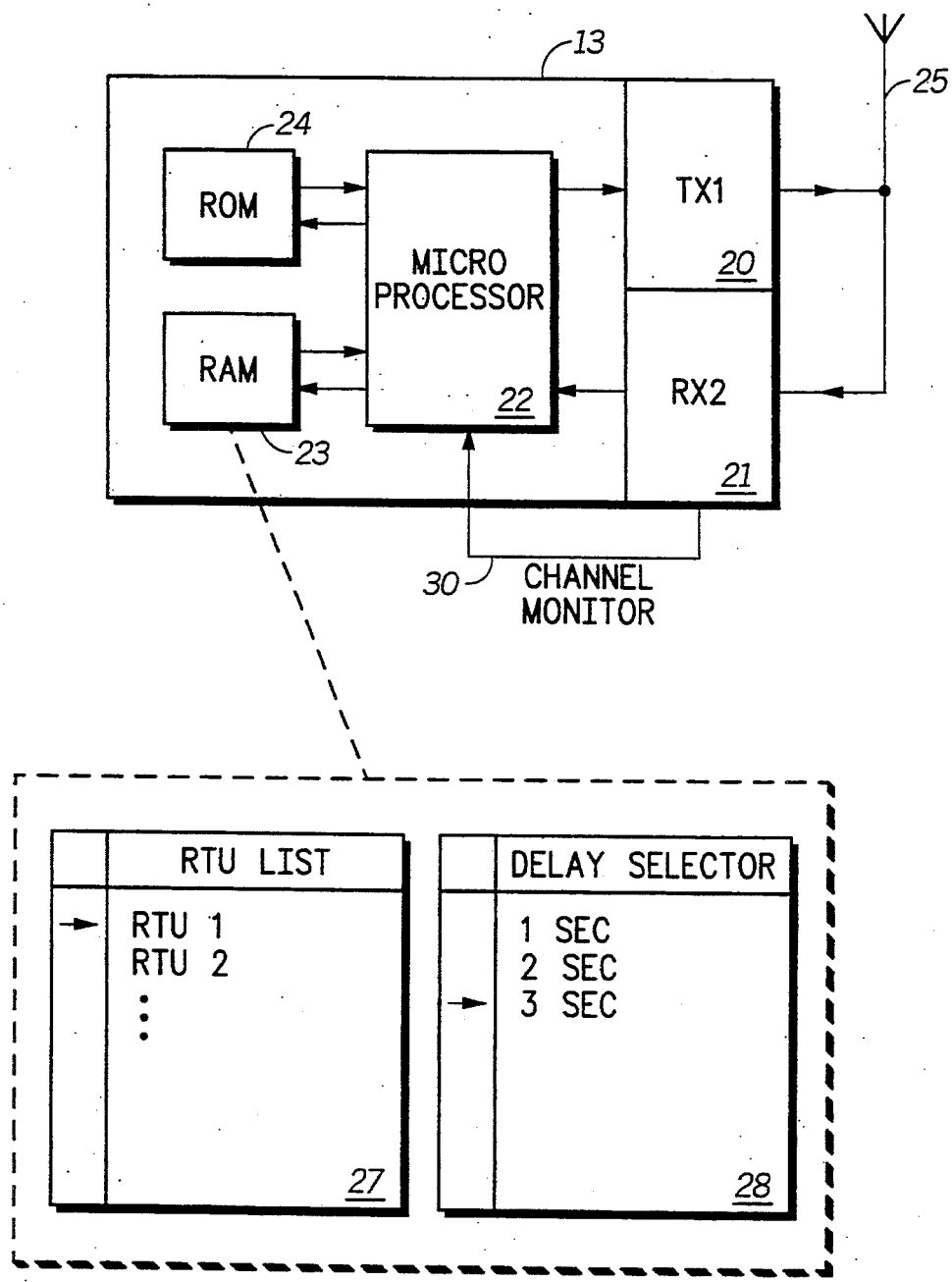
FIG. 2 shows a central unit ("regional center") 13 of FIG. 1, incorporating improvements in accordance with the invention.

Referring to FIG. 2, there is shown a regional center 13 comprising a transmitter part 20, a receiver part 21, a microprocessor 22, RAM memory 23 and ROM memory 24. Data is transmitted from the microprocessor 22 through the transmitter part 20 to an antenna 25, is received through the antenna and the receiver part 21 to the remote processor 22. The receiver part 21 has a channel monitor output 30, which passes to the microprocessor 22. The microprocessor 22 operates under control of a program stored in ROM memory 24 and reads data from and writes data to the RAM memory 23.

The RAM memory contains a number of registers, lists etc. Two of these lists are shown in the figure as RTU list 27 and delay selector 28. These are described in greater detail below with reference to FIG. 3.

RAM memory 23 also contains the following set up parameters, that are set at each individual regional center:

Interrogations window length—WWWW (for example 10 seconds)

Number of regional centers in the system:—CCCC (for example 3).

Figure 3A:
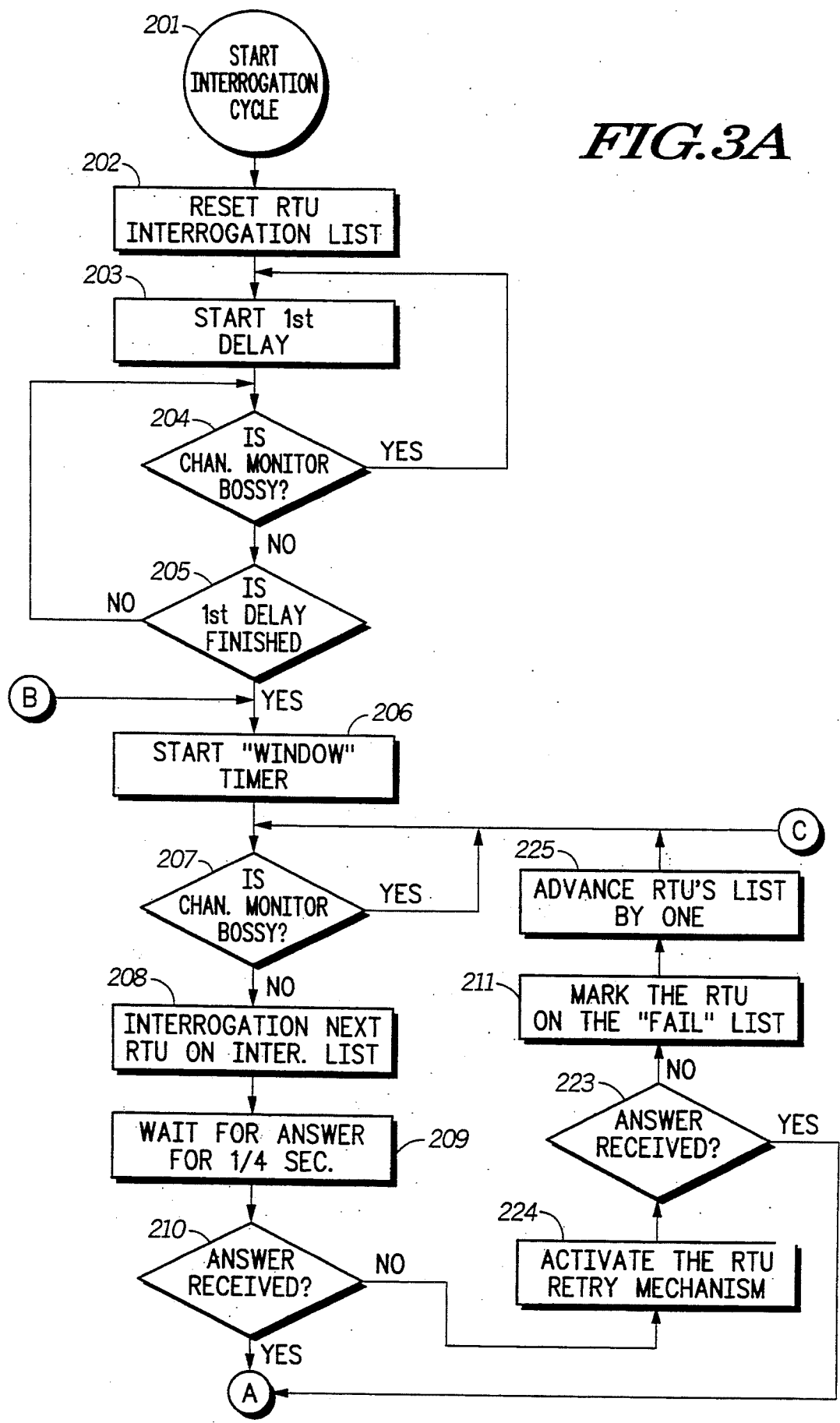
FIG. 3A and FIG. 3B show an algorithm for implementation in the central unit of FIG. 2.
Figure 3B:
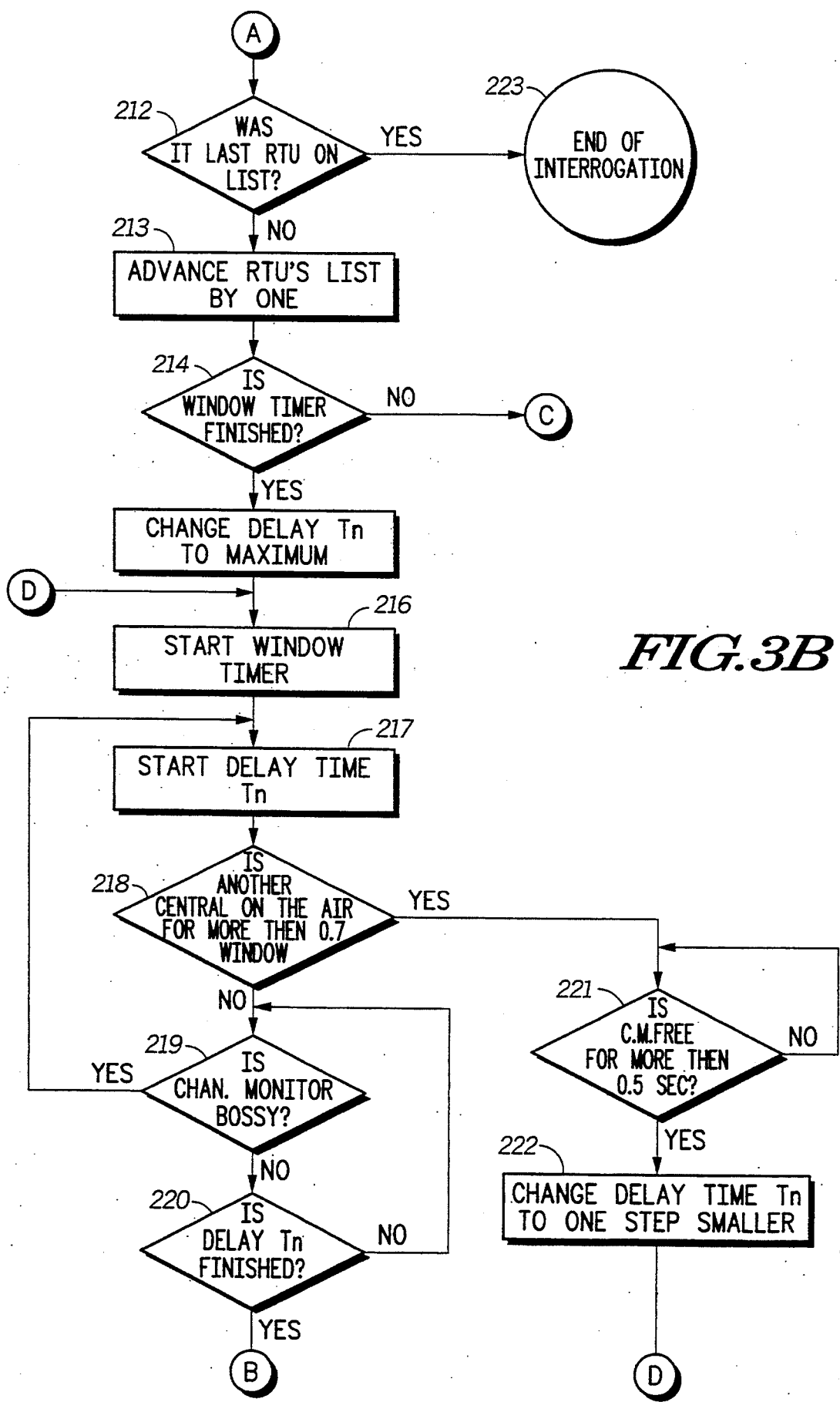

The algorithm illustrated in FIG. 3A and FIG. 3B is initiated at step 201 by the siren activation command received from the main central unit 11 via the repeater 12. An algorithm identical to that of FIG. 3A and FIG. 3B is initiated in all the regional centers 13, 14 and 15 simultaneously. Before describing the algorithm in detail, its overall operation is that each regional center has to wait a different time delay of free RF channel (no transmission on the radio channel) before it can start its interrogation routine. When the interrogation routine starts, each regional center interrogates only as many RTUs as it is able to interrogate in a predetermined time (referred to as an interrogation "window"—a cycle of interrogation of a few RTUs). While in the interrogation window period, each regional center contends for free channel before transmission by checking the channel monitor 30. When the channel is free, a regional center interrogates its RTUs one after the other without any delay. After the interrogation "window" time, a regional center will have to wait again for a minimum delay time of free RF channel before it can continue with another interrogation window. The total time to interrogate all the RTUs may take a few of these windows.

When a number of regional centers are operating on the same radio channel, the delay time of each given regional center changes dynamically after each interrogation window, so each unit's interrogation window alters.

As an example, a system will be described having three regional centers and a window time of 10 seconds (sufficient time to interrogate between 4 to 5 RTUs).

In order to eliminate as far as possible the likelihood of collisions between regional centers that might start with the same delay, the delay time before commencement of an interrogation cycle is, for the first regional center 13, selected from the set: 1.0, 2.0 and 3.0 seconds; for the second regional center the set 1.1, 2.1 and 3.1 seconds; and for the third regional center the set 1.2, 2.2 and 3.2 seconds. Fourth, fifth regional centers can have further sets of possible time delays following the same pattern. These exact timing delays are given by way of example only. It will, of course be understood by one skilled in the art that timing delays do not have to be "selected" from a table, but can be implemented by increasing and decreasing a value in appropriate steps. The principle of the preferred algorithm requires that there are at least "n" periods of the delay to each regional center, the number "n" equating to the number of regional centers on the same frequency. The corresponding delay steps in each regional center should be staggered vis-a-vis those in other regional centers.

These delays are illustrated in Table 1 as follows:

| FUNCTION | Regional center 13 (1st CENTRAL) | Regional center 14 (2nd CENTRAL) | Regional center 15 (3rd CENTRAL) | STEP |
| --- | --- | --- | --- | --- |
| Delay before 1st cycle | 1.0 | 1.1 | 1.2 | 101 |
| Operation | INTERROGATION | waiting | waiting | 102 |
| Delay before 2nd cycle | 3.0 | 1.1 | 1.2 | 103 |
| Operation | waiting | INTERROGATION | waiting | 104 |
| Delay before 3rd cycle | 2.0 | 3.1 | 1.2 | 105 |
| Operation | waiting | waiting | INTERROGATION | 106 |
| Delay before 4th cycle | 1.0 | 2.1 | 3.2 | 107 |
| Operation | INTERROGATION | waiting | waiting | 108 |
| Delay before 5th cycle | 3.0 | 1.1 | 2.2 | 109 |
| Operation | waiting | INTERROGATION | waiting | 110 |
| Delay before 6th cycle | 2.0 | 3.1 | 1.2 | 111 |
| Operation | waiting | waiting | INTERROGATION | 112 |
| Delay before 7th cycle | 1.0 | 2.1 | 3.2 | 113 |
| Operation | INTERROGATION | waiting | waiting | 114 |
| Delay before 9th cycle | 3.0 | 1.1 | 2.2 | 115 |

When the regional centers 13, 14 and 15 receive an interrogation start control command from the main central unit 11, all of them start their delay timer (step 101 in Table 1). The first regional center 13 having the one-second delay will be the first one to start the interrogation routine of its RTUs (step 102 and see below with reference to FIG. 3). The second and third regional centers 14 and 15, detecting the activity on the radio channel will wait and will not start their interrogation routines. After 10 seconds (the time of the first regional center interrogation "window"), the first regional center 13 finishes its interrogation and changes its delay time (Table 28 in FIG. 2) to 3 seconds (step 103). The second delay period starts and after 1.1 seconds, the second regional center 14 will start its interrogation window (step 104). When this is finished, the second regional center 14 changes its own delay to the maximum—3.1 seconds (step 105). Meanwhile, the delay of the first regional center 13 has changed to two seconds because of the fact that more than 0.7 of the window time has passed and the first regional center 13 has detected activity of other central units on the air, which prevented it from starting another interrogation window. After the second regional center 14 stops its interrogation, the delay of the third regional center 15 will be the shortest—1.2 seconds (step 105), so that it will start its window of interrogation (step 106). After the third regional center 15 has finished its interrogation window, it changes its own delay to 3.2 seconds (step 107) and in the meantime, the first regional center 13 has changed its delay to one second and the second regional center 14 has changed its delay to 2.1 seconds. Thus, the first regional center 13 will be the next to start another interrogation routine (108) and so on.

If only one regional center out of the three wishes to start an interrogation routine, it will wait three seconds (i.e. the highest delay time) between every interrogation window and will continue to interrogate all its RTUs in consecutive windows.

Referring now to FIG. 3, the interrogation routine carried out in each of the regional centers 13, 14 and 15 is illustrated. The routine is initiated by reception at the regional center in question of the initiation command from the main central unit 11 (which is preferably the same command as causes the sirens to start up). In step 202, the RTU interrogation list 27 (FIG. 2) is reset and in step 203, the first delay is commenced, according to step 101 of Table 1. During this delay, the regional center's receiver 21 monitors the radio frequency for activity on the channel (204). If the channel is free, and the first delay is finished (205), the regional center starts its window time WWWW (206). It checks again for free channel monitor (step 207) and if the channel is free, the regional center 13 sends an interrogation request to the first RTU (step 208). The regional center waits for an answer (step 209) and after the reception of the answer from the first RTU (210) the regional center checks whether it was the last RTU on the list (step 212). If it does not receive an answer (step 210) the regional center goes through a RTU fail mechanism in steps 224, 223, 211 and 225. If an answer has been received at 210, and it is not the last RTU on the list (212), the regional center advances the pointer of the RTUs list 27 to the next RTU that has to be interrogated (step 213). The regional center checks if the "window" timer WWWW is finished (step 214) and if it is not, its starts to interrogate the next RTU on the list from step 207 without delay. After interrogating a number of RTUs, the "window" timer will have finished and the delay time of the regional center changes to its maximum (step 215). This is also shown in Table 1 line 103 for the first regional center 13. The regional center starts the window timer (216) and the new delay timer (217). The regional center checks if it receives anything on the channel during the new delay time and if it does receive activity, it checks the length of the activity. If this is more than 0.7 of the "window" time 218, it means that another regional center is performing its interrogation cycle, so the regional center 13 in question waits for the other regional center (e.g. 14) to finish a "window". Thereupon, the channel becomes free (221) and the regional center changes its own delay timer to one step shorter (222) as shown in Table 1 line 105). The regional center 13 starts another decision cycle from step 216, but this time its delay timer is shorter. If at step 217 with the new shorter delay, the regional center does not receive any other unit, it continues through steps 218 and 219 to 220 and starts a new interrogation cycle of its own.

Thus an algorithm has been described, implemented in software routines in each regional center based on a revolving time delay in which the regional centers synchronize by interleaving the interrogation requests equally between them, so that of the central units are able to up-date their databases in equal time.

Moreover, a regional center can enter into contention at any time and "synchronize" to the other units on the channel and avoid collisions by virtue of commencing its delay from the time the channel becomes free and initiating a delay that is at no time the same as the delay for any other unit. All units commence their delays at the same time and each unit has a delay that is variable but always unique.

We claim:

1. A communication system comprising a primary unit, first and second secondary units for communicating with the primary unit over a radio channel and tertiary units for communicating with the secondary units over the channel, wherein the primary unit comprises means for transmitting a command to initiate contention and interrogation, each secondary unit comprises means for receiving said command to initiate contention and interrogation, delay means responsive to reception of said command for delaying for a period of time selected from a set of time delays, monitoring means for determining whether the channel is free, transmitting means for executing an interrogation cycle by transmitting to at least one of the tertiary units if the channel is still free at the end of the selected delay period, delay increase means for increasing the delay for the next transmission when an interrogation cycle is executed, and delay decrease means for decreasing the delay for the next transmission when an interrogation cycle is not executed, and wherein the time delays of the set of time delays of the first and second secondary units are different.

2. A system according to claim 1 wherein the time delays of the set of time delays of the first secondary unit are staggered with respect to the time delays of the set of time delays of the second secondary unit.

3. A method of performing interrogation of a plurality of secondary units by a primary unit over a radio communication channel, comprising the steps of:

receiving at the primary unit, over the communication channel, a command to initiate an interrogation cycle, selecting a time delay from a set of time delays, transmitting an interrogation request to each secondary unit of at least a subset of the plurality of secondary units in series after the selected time delay if the channel is free at the end of the selected time delay, selecting the longest time delay for the next interrogation cycle if a channel grant command is received and selecting a shorter time delay for the next interrogation cycle if no channel grant command is received.

4. A method according to claim 3, comprising the step of, at the primary unit, monitoring the channel, initiating a timer on detection of free channel and transmitting the interrogation request after the timer has counted through the time delay.

5. A communication unit for communicating with a plurality of other units over a radio channel, comprising means for contending for access to the channel, means for receiving a command to initiate an interrogation cycle and means, responsive to said means for contending for access, for transmitting to each of the other units in sequence following a successful contention in response to receipt of the command, wherein the means for contending comprises:

delay means for delaying initiation of said interrogation cycle for a period of time selected from a set of time delays, means for monitoring the channel at the end of said period of time and means for determining that contention is successful if the channel is free at the end of said period of time, and wherein, immediately following a successful contention, the time delay selected for the next contention is the longest of the set of time delays, whereas following an unsuccessful contention, a shorter time delay is selected for the next contention.

6. A communication system comprising a primary unit, first and second secondary units for communicating with the primary unit over a radio channel, tertiary units for communicating with the secondary units over the channel and at least one repeater, wherein the primary unit comprises means for transmitting a command to initiate contention and interrogation, the repeater is arranged to receive said command and retransmit it to the tertiary units, each tertiary unit is arranged to respond to said command by initiating an action, each secondary unit comprises means for receiving said command to initiate contention and interrogation, delay means responsive to reception of said command for delaying for a period of time selected from a set of time delays, monitoring means for determining whether the channel is free, transmitting means for executing an interrogation cycle by transmitting to at least one of the tertiary units if the channel is still free at the end of the selected delay period, and the tertiary units are arranged to respond to transmissions from the secondary units by confirming that the action has been initiated.

* * * * *